United States Patent
Dangoor et al.

(10) Patent No.: US 11,861,732 B1
(45) Date of Patent: Jan. 2, 2024

(54) INDUSTRY-PROFILE SERVICE FOR FRAUD DETECTION

(71) Applicant: INTUIT INC., Mountain View, CA (US)

(72) Inventors: Sheer Dangoor, Tel Aviv (IL); Aviv Ben Arie, Tel Aviv (IL); Yair Horesh, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/815,550

(22) Filed: Jul. 27, 2022

(51) Int. Cl.
  *G06Q 40/12* (2023.01)
  *G06N 7/01* (2023.01)

(52) U.S. Cl.
  CPC .............. *G06Q 40/12* (2013.12); *G06N 7/01* (2023.01)

(58) Field of Classification Search
  None
  See application file for complete search history.

(56) References Cited

U.S. PATENT DOCUMENTS

| | | | | |
|---|---|---|---|---|
| 10,601,454 B1* | 3/2020 | Luus | ...................... | G06N 3/045 |
| 11,138,674 B2* | 10/2021 | Chatman | ................ | G06Q 40/12 |
| 2006/0136184 A1* | 6/2006 | Gustafsson | ............ | G16B 20/20 |
| | | | | 703/11 |
| 2008/0050357 A1* | 2/2008 | Gustafsson | ............ | G16B 40/30 |
| | | | | 435/243 |
| 2014/0278771 A1* | 9/2014 | Rehman | .................... | G06N 7/01 |
| | | | | 705/7.31 |
| 2015/0356688 A1* | 12/2015 | Katz | ...................... | G06F 16/215 |
| | | | | 705/30 |
| 2016/0140666 A1* | 5/2016 | Dantu | .................... | G06Q 40/12 |
| | | | | 705/30 |
| 2016/0196615 A1* | 7/2016 | Yen | ..................... | G06Q 20/4016 |
| | | | | 705/30 |
| 2018/0225667 A1* | 8/2018 | Wang | ..................... | G06N 20/20 |
| 2018/0349929 A1* | 12/2018 | Blomberg | .............. | G06Q 40/12 |
| 2019/0019202 A1* | 1/2019 | Takamatsu | ......... | G06Q 30/0254 |
| 2020/0104369 A1* | 4/2020 | Bellegarda | .............. | G06F 40/30 |
| 2020/0177219 A1* | 6/2020 | Luus | ....................... | G06N 3/088 |
| 2020/0243164 A1* | 7/2020 | Qiao | ....................... | G16B 25/10 |
| 2021/0182877 A1* | 6/2021 | Horesh | .................. | G06N 20/00 |
| 2021/0184200 A1* | 6/2021 | Dharmasena | ......... | H01M 4/045 |
| 2021/0256394 A1* | 8/2021 | Tymoshenko | ......... | G06N 3/123 |
| 2021/0256579 A1* | 8/2021 | Horesh | .................. | G06N 3/006 |

(Continued)

*Primary Examiner* — Fateh M Obaid
(74) *Attorney, Agent, or Firm* — DLA PIPER LLP (US)

(57) ABSTRACT

Techniques for detecting fraud may include obtaining a merchant's financial data; determining, via a machine learning model, a first prediction of the merchant's industry; generating a first probability matrix based on the first prediction and the declared information regarding the merchant's industry; determining, via the machine learning model, a second prediction of the merchant's industry; generating a second probability matrix based on the second prediction and the declared information regarding the merchant's industry; obtaining a declared industry of a subject merchant in a runtime environment; determining, via the machine learning model, a predicted industry for the subject merchant; obtaining, based on the declared industry and the predicted industry of the subject merchant, a first value from the first probability matrix and a second value from the second probability matrix; and labeling the subject merchant for further investigation.

20 Claims, 4 Drawing Sheets

(56) References Cited

U.S. PATENT DOCUMENTS

| | | | |
|---|---|---|---|
| 2021/0279729 A1* | 9/2021 | Lee | G06N 20/00 |
| 2021/0383407 A1* | 12/2021 | Pati | G06N 20/00 |
| 2022/0114676 A1* | 4/2022 | Verma | G06F 16/24564 |
| 2022/0180232 A1* | 6/2022 | Dasgupta | G06F 16/25 |
| 2022/0405859 A1* | 12/2022 | Horesh | G06N 5/04 |
| 2023/0176557 A1* | 6/2023 | Cella | G05B 19/4188 |
| | | | 700/117 |

* cited by examiner

INDUSTRY-PROFILE SERVICE FOR FRAUD DETECTION

BACKGROUND

Fraud incurs hundreds of million dollars in losses to financial services customers and businesses annually, not counting the damage to the very fabric of trust consumers and merchants need. One such common fraud method is called collusion, which involves fraudulently opening an account, upgrading to payments, and using stolen credit cards or ACH numbers with their passwords (usually bought at the dark web) to pay for an invoice that will be challenged by the real owners in few days (chargeback). By the time the invoice is challenged, the funds are already withdrawn from the real owner's bank account. Accordingly, there is a need and desire for improved fraud protection.

BRIEF DESCRIPTION OF DRAWINGS

Other objects and advantages of the present disclosure will become apparent to those skilled in the art upon reading the following detailed description of example embodiments, in conjunction with the accompanying drawings, in which like reference numerals have been used to designate like elements, and in which.

DESCRIPTION

The systems and methods of the present disclosure provide a machine learning based solution to the technical problem of identifying fraudulent or other criminal activity such as e.g., fraudulent merchants, fraudulent transactions, criminal monetary transactions, and fake invoices.

Figure 1:
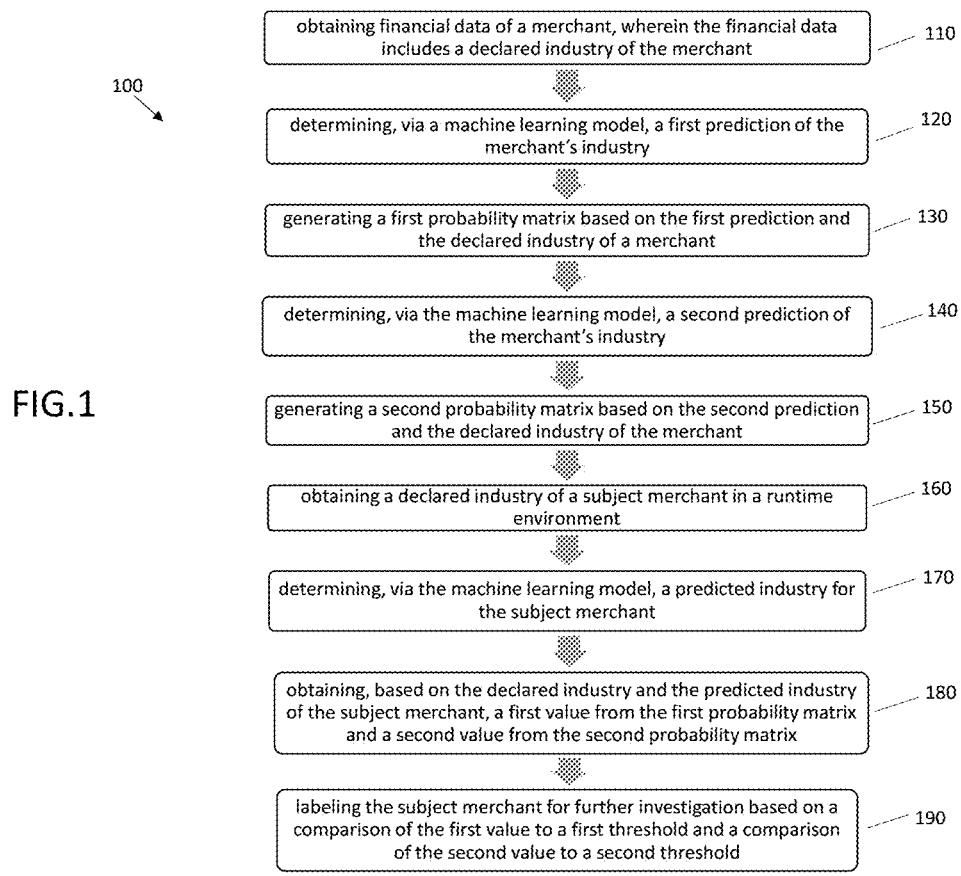
FIG. 1 shows a flowchart of a method according to an example embodiment of the present disclosure.

FIG. 1 shows a flowchart for a computer-implemented method 100 for detecting fraud in accordance with an example embodiment of the present disclosure. Certain aspects of the method 100 are disclosed in U.S. patent application Ser. No. 16/710,973, which is incorporated herein by reference in its entirety.

The steps of method 100 are exemplary, and elements may be added or removed from the method 100 without deviating from the inventive concepts of the present application. In one or more embodiments, the method 100 may include the following steps: a step 110 of obtaining financial data of a merchant, wherein the financial data includes a declared industry of the merchant; a step 120 of determining, via a machine learning model, a first prediction of the merchant's industry; a step 130 of generating a first probability matrix based on the first prediction and the declared information regarding the merchant's industry; a step 140 of determining, via the machine learning model, a second prediction of the merchant's industry; a step 150 of generating a second probability matrix based on the second prediction and the declared information regarding the merchant's industry; a step 160 of obtaining a declared industry of a subject merchant in a runtime environment; a step 170 of determining, via the machine learning model, a predicted industry for the subject merchant; a step 180 of obtaining, based on the declared industry and the predicted industry of the subject merchant, a first value from the first probability matrix and a second value from the second probability matrix, and a step 190 of labeling the subject merchant for further investigation based on a comparison of the first value to a first threshold and a comparison of the second value to a second threshold.

In one or more embodiments, at step 110, the financial data can be obtained from various sources including, but not limited to, data management systems such as small business data management systems, personal financial data management systems, transaction data management systems, and the like, that offer various financial document preparation and submission capabilities such as billing, bill payment, estimates, inventory, and other financial document creation and dissemination capabilities, to the users of these data management systems.

In example embodiments, the financial data can be obtained from financial data documents that include, but are not limited to, invoices generated by the merchant; invoices received by the merchant; estimates provided by the merchant; inventory documents associated with the merchant; revenue documents associated with the merchant; accounting documents associated with the merchant; correspondence documents associated with the merchant; social media postings associated with the merchant; website postings associated with the merchant; domain names associated with the merchant; email addresses associated with the merchant; phone numbers associated with the merchant; addresses associated with the merchant; and any other document or business related document data associated with a merchant as discussed herein, known in the art at the time of filing, or as becomes known after the time of filing.

One or more of the aforementioned financial data documents may provide information regarding a self-declaration or self-reporting by a merchant of their industry (i.e., declared information regarding the merchant's industry), which may be based on a classification of industries by its type of economic activity (process of production). Non-limiting examples include the North American Industry Classification System (NAICS) code, a Merchant Category Code system (MCC) code, Standard Industrial Classification (SIC) system, etc. Well known examples of industries include educational services, accommodation and food services, mining, real estate and rental and leasing, to name a few.

Known techniques can be used to obtain or extract relevant financial data (e.g., a self-declaration or self-reporting by a merchant of their industry) from the financial data documents. For example, optical Character Recognition (OCR) techniques and/or JSON formatting can be used to identify and extract the financial data associated with each of the financial documents.

In one or more embodiments, the method 100 includes the step 120 of determining, via a machine learning model, a first prediction of the merchant's industry. The machine learning model can be trained as described in FIG. 1 of U.S. patent application Ser. No. 16/710,973 and the associated description. In an example embodiment, the training data can be generated using a subset (e.g., 20%) of merchants. The machine learning model can be a supervised learning model (e.g., neural networks, support vector machines, etc.) or an unsupervised learning model (e.g., regression, reinforcement learning, clustering etc.). U.S. patent application Ser. No. 16/710,973 provides further details of the machine learning models.

The predictions generated by the machine learning model include data indicating one or more industries associated with the merchant. The first prediction has the highest business segment probability score of all the predictions of the machine learning model. As described in U.S. patent application Ser. No. 16/710,973, this score indicates a probability or confidence in the model's prediction of the merchant's industry.

In one or more embodiments, the method 100 includes the step 130 of generating a first probability matrix based on the first prediction (determined in step 120) and the declared information (obtained in step 110) regarding the merchant's industry. Known methods of generating a probability matrix may be used for this step. An example of such a method is described in U.S. Patent Publication No. U.S.20210256579A1, incorporated herein by reference.

Figure 2:
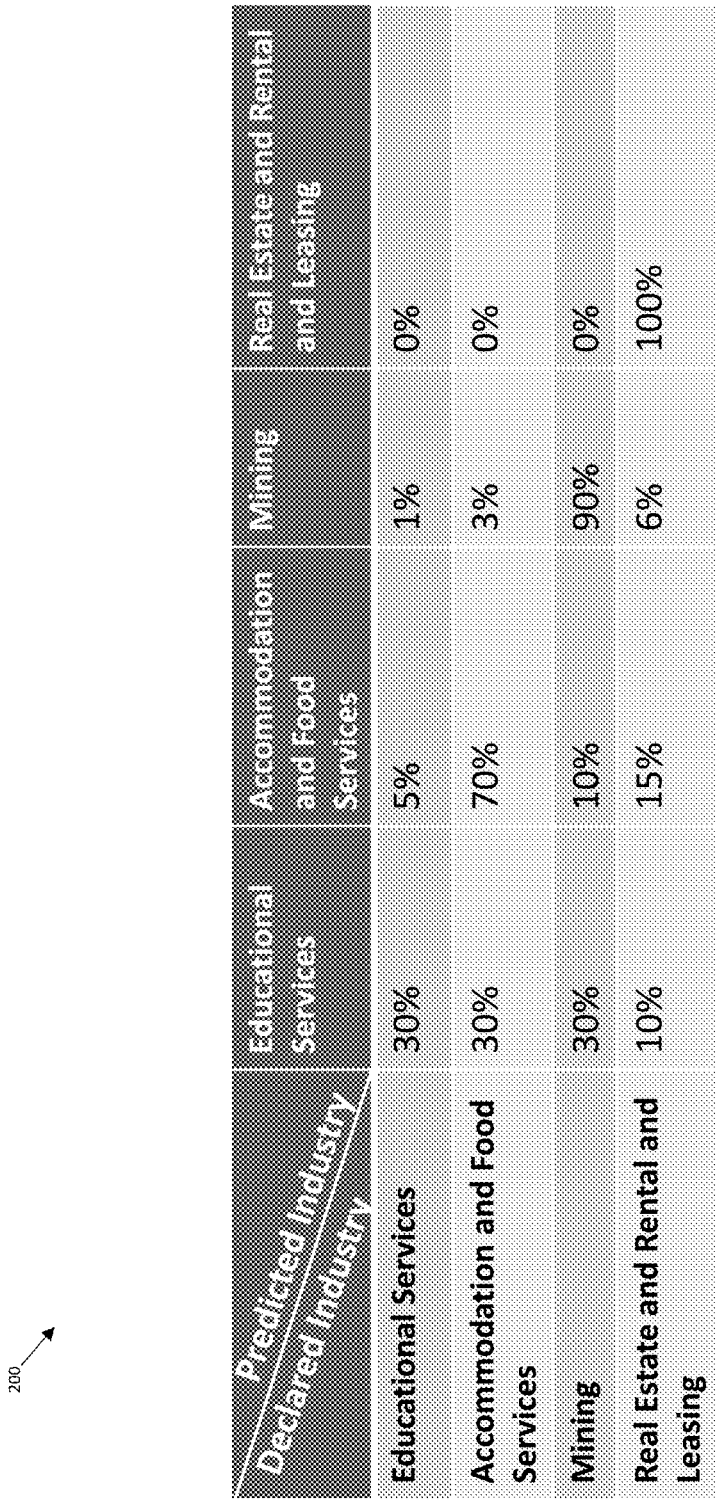
FIG. 2 illustrates an example probability matrix according to an example embodiment of the present disclosure.

FIG. 2 shows an example first probability matrix 200 generated using step 130. In this example, the predicted industry (rows of the matrix) and the declared industry (columns of the matrix) are educational services, accommodation and food services, mining, and real estate and rental and leasing.

For the prediction "Educational Services", the declared industry is 30% "Educational Services"; 30% "Accommodation and Food Services"; 30% "Mining"; and 10% "Real Estate and Rental and Leasing". Therefore, for each of the predictions (predicted industry), the sum of the declared industry percentages is 100% (30%+30% +30%+10%).

For the prediction "Accommodation and Food Services", the declared industry is 5% "Educational Services"; 70% "Accommodation and Food Services"; 10% "Mining"; and 15% "Real Estate and Rental and Leasing", with the sum being 100%. For the prediction "Mining", the declared industry is 1')/0 "Educational Services"; 3% "Accommodation and Food Services"; 90% "Mining"; and 6% "Real Estate and Rental and Leasing", with the sum being 100%. For the prediction "Real Estate and Rental and Leasing", the declared industry is 0% "Educational Services"; 0% "Accommodation and Food Services"; 0% "Mining"; and 100% "Real Estate and Rental and Leasing", with the sum being 100%.

In one or more embodiments, the method 100 includes the step 140 of determining, via the machine learning model, a second prediction of the merchant's industry. Similar to the first prediction, the second prediction includes data indicating one or more industries associated with the merchant. The second prediction has the second highest business segment probability score of all the predictions of the machine learning model. As described in U.S. patent application Ser. No. 16/710,973, this score indicates a probability or confidence in the model's prediction of the merchant's industry.

In one or more embodiments, the method 100 includes the step 150 of generating a second probability matrix based on the second prediction and the declared information regarding the merchant's industry. Similar to step 130, known methods of generating a probability matrix may be used for step 150.

Figure 3:
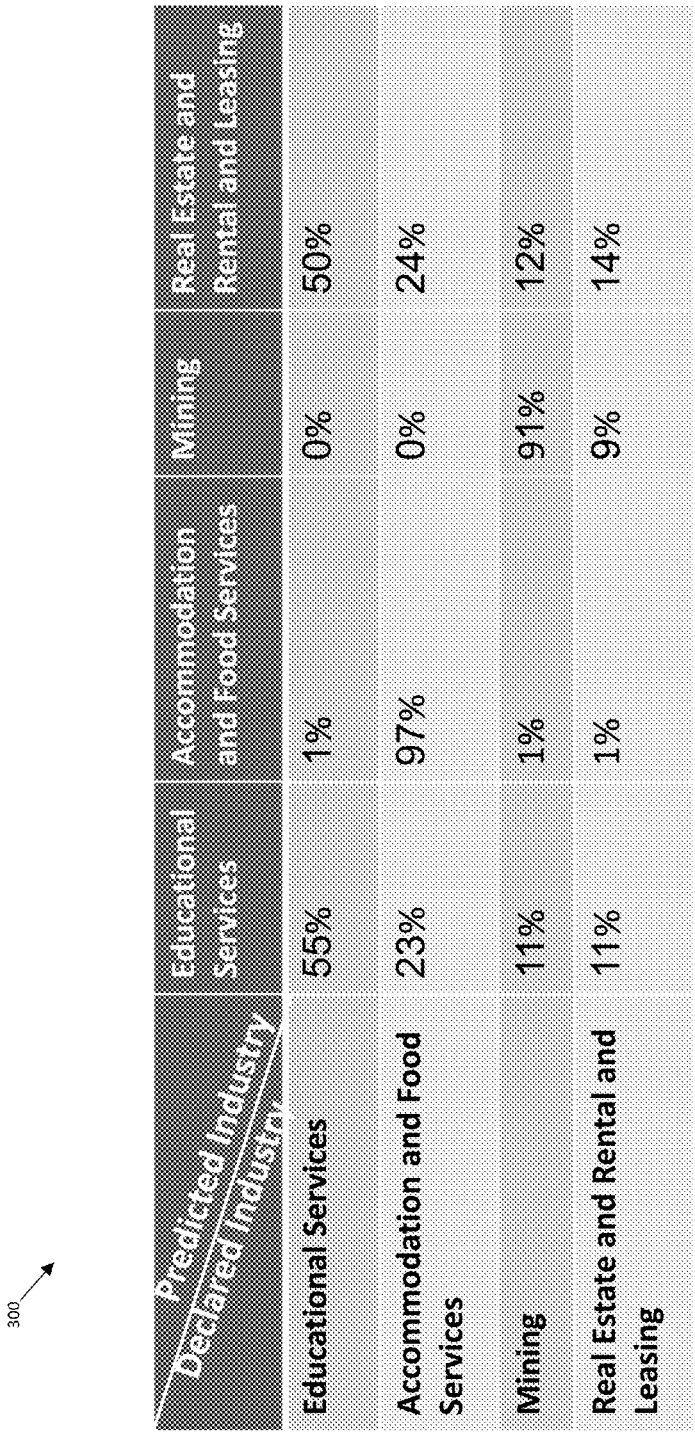
FIG. 3 shows another example probability matrix according to an example embodiment of the present disclosure.

FIG. 3 shows an example second probability matrix 300 generated using step 150. In this example, the predicted industry (rows of the matrix) and the declared industry (columns of the matrix) are educational services, accommodation and food services, mining, and real estate and rental and leasing.

For the prediction "Educational Services", the declared industry is 55% "Educational Services"; 23% "Accommodation and Food Services"; 11% "Mining"; and 11% "Real Estate and Rental and Leasing". Therefore, for each of the predictions (predicted industry), the sum of the declared industry percentages is a 100% (55%+23%+11%+11%).

For the prediction "Accommodation and Food Services", the declared industry is 1%"Educational Services"; 97% "Accommodation and Food Services"; 1% "Mining"; and 1% "Real Estate and Rental and Leasing", with the sum being 100%. For the prediction "Mining", the declared industry is 0% "Educational Services"; 0% "Accommodation and Food Services"; 91% "Mining"; and 9% "Real Estate and Rental and Leasing", with the sum being 100%. For the prediction "Real Estate and Rental and Leasing", the declared industry is 50% "Educational Services"; 24% "Accommodation and Food Services"; 12% "Mining"; and 14% "Real Estate and Rental and Leasing", with the sum being 100%.

The term "merchant" as used with respect to steps 110-150 is not limited to a single merchant but can also include multiple merchants. Similarly, the term "merchant's industry" can refer to the respective industry of each merchant if multiple merchants are involved.

As discussed in more detail below, after the first and second probability matrices are generated as described with respect to steps 140 and 150, they are deployed in a runtime environment to generate probable industry data for a merchant (i.e., subject merchant) based on that merchant's financial document data.

In one or more embodiments, the method 100 includes the step 160 of obtaining a declared industry of a subject merchant in the runtime environment. The subject merchant can be a merchant that has been previously identified as conducting business in one or more industries and may have a unique merchant identifier.

In example embodiments, the declared industry associated with the subject merchant can be obtained/extracted using known techniques from financial data documents of the subject merchant that include, but are not limited to, invoices generated by the merchant; invoices received by the merchant; estimates provided by the merchant; inventory documents associated with the merchant; revenue documents associated with the merchant; accounting documents associated with the merchant; correspondence documents associated with the merchant; social media postings associated with the merchant; website postings associated with the merchant; domain names associated with the merchant; email addresses associated with the merchant; phone numbers associated with the merchant; addresses associated with the merchant; and any other document or business related document data associated with a merchant as discussed herein, known in the art at the time of filing, or as becomes known after the time of filing.

In one or more embodiments, OCR (optical character recognition) techniques are used to identify and extract the declared industry from financial documents associated with the subject merchant. Various OCR systems and techniques are well known to those of skill in the art. Consequently, a more detailed description of the operation of any specific OCR technique used to identify and extract the declared industry associated with each of the financial documents is omitted here to avoid detracting from the invention.

In another example embodiment, JSON (JavaScript Object Notation) can be used as an open-standard file format that uses human readable text to transmit data objects consisting of attribute-value pairs and array data types. Importantly, when text is converted into JSON file format each object in the text is described as an object at a very precise location in the text document. Consequently, when text data, such as subject merchant's financial documents data is converted into JSON file format, the declared industry of the subject merchant can be indicated as the object and the precise location of the object and data associated with that object in the vicinity of the object is indicated. Consequently, by converting merchant financial documents data into a JSON file format, the identification of the declared industry within the merchant financial document data is a relatively trivial task. JSON is well known to those of skill in the art, therefore a more detailed discussion of JSON, and JSON file formatting, is omitted here to avoid detracting from the invention.

In one or more embodiments, the method 100 includes the step 170 of determining, via the machine learning model, a predicted industry for the subject merchant. In various embodiments, the predicted industry represents one or more business codes determined to be associated with the subject merchant's financial documents data such as a North American Industry Classification System (NAICS) code, a Merchant Category Code system (MCC) code, or any code used with any standardized business segment classification systems as discussed herein or known in the art at the time of filing, or as become known after the time of filing.

In one or more embodiments, the method 100 includes the step 180 of obtaining, based on the declared industry (determined in step 160) and the predicted industry (determined step 170) of the subject merchant, a first value from the first probability matrix and a second value from the second probability matrix.

As an example, if in step 160, the declared industry of the subject merchant is "Accommodation and Food Services" and the predicted industry is "Educational Services", the first value obtained in step 180 is 30% and the second value obtained in step 180 is 23%. As another example, if in step 160, the declared industry of the subject merchant is "Educational Services" and the predicted industry is "Accommodation and Food Services", the first value obtained in step 180 is 5% and the second value obtained in step 180 is 1%.

In one or more embodiments, the method 100 includes the step 190 of labeling the subject merchant for further investigation based on a comparison of the first value to a first threshold and a comparison of the second value to a second threshold. For example, the subject merchant can be labeled for further investigation when the first value is lower than a first threshold and/or the second value is lower than a second threshold. In some embodiments, the first threshold and the second thresholds can be the same. In other embodiments, the first and/or second thresholds can vary based on the industry of the prediction (for e.g., educational services can have 25% as the threshold, but mining may have 10% as the threshold).

In an example embodiment, the first and second thresholds can both be set to 25%. As noted in the above example, with the predicted industry as educational services, the first value is 30% (>25%) and the second value is 23% (<25%). Therefore, the subject merchant is labeled for further investigation because one of the two values, i.e., the second value=23% is lower than the threshold 25%.

In another example embodiment, with the same numbers provided in the previous example (the first and second thresholds can both be set to 25%, the predicted industry as educational services, the first value is 30% and the second value is 23%), labeling may not occur because both values (30% and 23%) are not lower than the threshold (25%). This is because, in this embodiment, labeling the subject merchant for further investigation will only occur when both the first value (30%) is lower than a first threshold (25%) and the second value (23%) is lower than a second threshold (25%).

The labeling for further investigation can be used to identify and prevent fraudulent or other criminal activity. The protective actions to prevent such activity can include, but are not limited to, contacting the merchant to clarify the discrepancy in industry assignment; suspending all merchant activity within a data management system used by the merchant until the discrepancy in in the industry is resolved; sending financial document data associated with the merchant to a fraud/criminal activity specialist for analysis; closing down any accounts within a data management system used by the merchant; or any other protective action as discussed herein, or known at the time of filing, or that become known after the time of filing.

Some or all of the aforementioned embodiments of the method 100 can be directed to various software/products/services such as catalog services, order services, subscription services, billing services, account services, entitlement services for tax preparation software product or software service, financial management software product or software service, payroll software product or software service, accounting software product or software service, etc.

Figure 4:
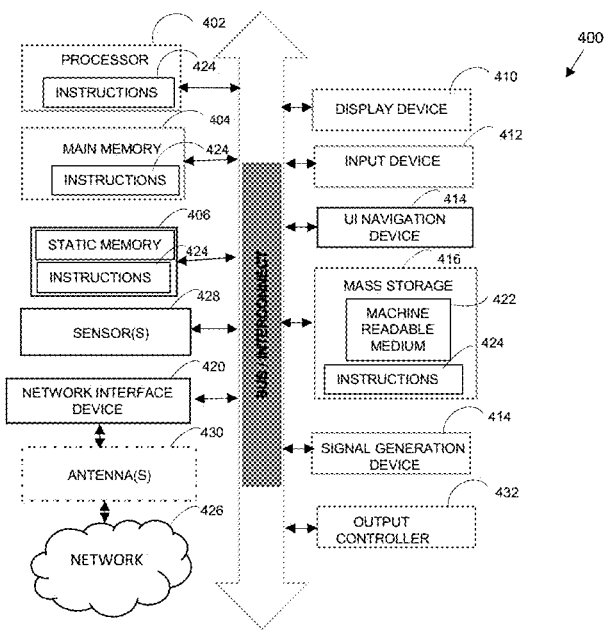
FIG. 4 illustrates an example of a machine configured to perform computing operations according to an embodiment of the present disclosure.

FIG. 4 is a block diagram illustrating an example computing system 400 for detecting fraud upon which any one or more of the methodologies (e.g., method 100) herein discussed may be run according to an example described herein. Computer system 400 may be embodied as a computing device, providing operations of the components featured in the various figures, including components of the method 100, or any other processing or computing platform or component described or referred to herein.

In alternative embodiments, the computing system 400 can operate as a standalone device or may be connected (e.g., networked) to other machines. In a networked deployment, the computing system 400 may operate in the capacity of either a server or a client machine in server-client network environments, or it may act as a peer machine in peer-to-peer (or distributed) network environments.

Example computer system 400 includes a processor 402 (e.g., a central processing unit (CPU), a graphics processing unit (GPU) or both), a main memory 404 and a static memory 406, which communicate with each other via an interconnect 408 (e.g., a link, a bus, etc.). The computer system 400 may further include a video display unit 410, an input device 412 (e.g., keyboard) and a user interface (UI) navigation device 414 (e.g., a mouse). In one embodiment, the video display unit 410, input device 412 and UI navigation device 414 are a touch screen display. The computer system 400 may additionally include a storage device 416 (e.g., a drive unit), a signal generation device 418 (e.g., a speaker), an output controller 432, and a network interface device 420 (which may include or operably communicate with one or more antennas 430, transceivers, or other wireless communications hardware), and one or more sensors 428.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 constituting machine-readable media.

While the machine-readable medium 422 (or computer-readable medium) is illustrated in an example embodiment to be a single medium, the term "machine-readable medium" may include a single medium or multiple medium (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, optical media, magnetic media or other non-transitory media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of several well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that can store, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area Internet network connection, it will be understood that communications may also be facilitated using any number of personal area networks, LANs, and WANs, using any combination of wired or wireless transmission mediums.

The embodiments described above may be implemented in one or a combination of hardware, firmware, and software. For example, the features in the system architecture 400 of the processing system may be client-operated software or be embodied on a server running an operating system with software running thereon. While some embodiments described herein illustrate only a single machine or device, the terms "system", "machine", or "device" shall also be taken to include any collection of machines or devices that individually or jointly execute a set (or multiple sets) of instructions to perform any one or more of the methodologies discussed herein.

Examples, as described herein, may include, or may operate on, logic or several components, modules, features, or mechanisms. Such items are tangible entities (e.g., hardware) capable of performing specified operations and may be configured or arranged in a certain manner. In an example, circuits may be arranged (e.g., internally or with respect to external entities such as other circuits) in a specified manner as a module, component, or feature. In an example, the whole or part of one or more computer systems (e.g., a standalone, client or server computer system) or one or more hardware processors may be configured by firmware or software (e.g., instructions, an application portion, or an application) as an item that operates to perform specified operations. In an example, the software may reside on a machine readable medium. In an example, the software, when executed by underlying hardware, causes the hardware to perform the specified operations.

Accordingly, such modules, components, and features are understood to encompass a tangible entity, be that an entity that is physically constructed, specifically configured (e.g., hardwired), or temporarily (e.g., transitorily) configured (e.g., programmed) to operate in a specified manner or to perform part or all operations described herein. Considering examples in which modules, components, and features are temporarily configured, each of the items need not be instantiated at any one moment in time. For example, where the modules, components, and features comprise a general-purpose hardware processor configured using software, the general-purpose hardware processor may be configured as respective different items at different times. Software may accordingly configure a hardware processor, for example, to constitute a particular item at one instance of time and to constitute a different item at a different instance of time.

Additional examples of the presently described method, system, and device embodiments are suggested according to the structures and techniques described herein. Other non-limiting examples may be configured to operate separately or can be combined in any permutation or combination with any one or more of the other examples provided above or throughout the present disclosure.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

The invention claimed is:

1. A computer-implemented method for detecting fraud, comprising:
   obtaining financial data of a merchant, wherein the financial data includes a declared industry of the merchant;
   determining, via a machine learning model trained on vectorized merchant data, a first prediction of the merchant's industry from a set of possible industries, wherein the first prediction has a highest business segment confidence score in a set of predictions associated with the set of possible industries and indicates a confidence in the machine learning model model's first prediction of the merchant's industry;
   generating a first probability matrix based on the first prediction and the declared industry of a merchant;
   determining, via the machine learning model, a second prediction of the merchant's industry from a second set of possible industries, wherein the second prediction has a second highest business segment confidence score in the set of predictions associated with the set of possible industries and indicates a confidence in the machine learning model model's second prediction of the merchant's industry;
   generating a second probability matrix based on the second prediction and the declared industry of the merchant;
   obtaining a declared industry of a subject merchant in a runtime environment;
   determining, via the machine learning model, a predicted industry for the subject merchant;

obtaining, based on the declared industry and the predicted industry of the subject merchant, a first value from the first probability matrix and a second value from the second probability matrix; and labeling the subject merchant for further investigation based on a comparison of the first value to a first threshold and a comparison of the second value to a second threshold.

2. The method of claim 1, wherein the first threshold and the second threshold are based on the predicted industry of the subject merchant.

3. The method of claim 1, wherein the first threshold and the second threshold are the same.

4. The method of claim 1, wherein the first threshold and the second threshold are different.

5. The method of claim 1, wherein labeling the subject merchant for further investigation occurs when both the first value is lower than the first threshold and the second value is lower than the second threshold.

6. The method of claim 1, wherein labeling the subject merchant for further investigation occurs when the first value is lower than the first threshold or the second value is lower than the second threshold.

7. The method of claim 1, wherein the financial data is obtained from financial data documents associated with the merchant.

8. A system for detecting fraud comprising a processor and an associated memory, the processor being configured for:

obtaining financial data of a merchant, wherein the financial data includes a declared industry of the merchant;

determining, via a machine learning model trained on vectorized merchant data, a first prediction of the merchant's industry from a set of possible industries, wherein the first prediction has a highest business segment confidence score in a set of predictions associated with the set of possible industries and indicates a confidence in the machine learning model model's first prediction of the merchant's industry;

generating a first probability matrix based on the first prediction and the declared industry of a merchant;

determining, via the machine learning model, a second prediction of the merchant's industry from a second set of possible industries, wherein the second prediction has a second highest business segment confidence score in the set of predictions associated with the set of possible industries and indicates a confidence in the machine learning model model's second prediction of the merchant's industry;

generating a second probability matrix based on the second prediction and the declared industry of a merchant;

obtaining a declared industry of a subject merchant in a runtime environment;

determining, via the machine learning model, a predicted industry for the subject merchant;

obtaining, based on the declared industry and the predicted industry of the subject merchant, a first value from the first probability matrix and a second value from the sec and probability matrix; and labeling the subject merchant for further investigation based on a comparison of the first value to a first threshold and a comparison of the second value to a second threshold.

9. The system of claim 8, wherein the first threshold and the second threshold are based on the predicted industry of the subject merchant.

10. The system of claim 8, wherein the first threshold and the second threshold are the same.

11. The system of claim 8, wherein the first threshold and the second threshold are different.

12. The system of claim 8, wherein labeling the subject merchant for further investigation occurs when both the first value is lower than a first threshold and the second value is lower than a second threshold.

13. The system of claim 8, wherein labeling the subject merchant for further investigation occurs when the first value is lower than a first threshold or the second value is lower than a second threshold.

14. The system of claim 8, wherein the financial data is obtained from financial data documents associated with the merchant.

15. A computer program product for detecting fraud comprising a non -transitory computer readable storage medium having program instructions embodied therewith, the program instructions for:

obtaining financial data of a merchant, wherein the financial data includes a declared industry of the merchant;

determining, via a machine learning model trained on vectorized merchant data, a first prediction of the merchant's industry from a set of possible industries, wherein the first prediction has a highest business segment confidence score in a set of predictions associated with the set of possible industries and indicates a confidence in the machine learning model model's first prediction of the merchant's industry;

generating a first probability matrix based on the first prediction and the declared industry of a merchant;

determining, via the machine learning model, a second prediction of the merchant's industry from a second set of possible industries, wherein the second prediction has a second highest business segment confidence score in the set of predictions associated with the set of possible industries and indicates a confidence in the machine learning model model's second prediction of the merchant's industry;

generating a second probability matrix based on the second prediction and the declared industry of a merchant;

obtaining a declared industry of a subject merchant in a runtime environment;

determining, via the machine learning model, a predicted industry for the subject merchant;

obtaining, based on the declared industry and the predicted industry of the subject merchant, a first value from the first probability matrix and a second value from the second probability matrix; and labeling the subject merchant for further investigation based on a comparison of the first value to a first threshold and a comparison of the second value to a second threshold.

16. The computer program product of claim 15, wherein the first threshold and the second threshold are based on the predicted industry of the subject merchant.

17. The computer program product of claim 15, wherein the first threshold and the second threshold are the same.

18. The computer program product of claim 15, wherein the first threshold and the second threshold are different.

19. The computer program product of claim 15, wherein labeling the subject merchant for further investigation occurs when both the first value is lower than a first threshold and the second value is lower than a second threshold.

20. The computer program product of claim 15, wherein labeling the subject merchant for further investigation occurs when the first value is lower than a first threshold or the second value is lower than a second threshold.

* * * * *